US012603680B2

(12) United States Patent
Raghavan et al.

(10) Patent No.: US 12,603,680 B2
(45) Date of Patent: Apr. 14, 2026

(54) SWITCHING BETWEEN POLARIZATION AND SPATIAL MULTIPLE-INPUT-MULTIPLE-OUTPUT BASED ON A MULTIBAND ANTENNA

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 18/315,977

(22) Filed: May 11, 2023

(65) Prior Publication Data

US 2024/0380448 A1     Nov. 14, 2024

(51) Int. Cl.
*H04B 7/0456*     (2017.01)
*H04B 7/06*     (2006.01)
*H04B 7/10*     (2017.01)

(52) U.S. Cl.
CPC ......... *H04B 7/0456* (2013.01); *H04B 7/0608* (2013.01); *H04B 7/10* (2013.01)

(58) Field of Classification Search
CPC ...... H04B 7/0456; H04B 7/0608; H04B 7/10; H04B 7/0404; H04B 7/0469; H04B 7/0628; H04B 7/0691; H04B 7/0697
See application file for complete search history.

(56) References Cited

U.S. PATENT DOCUMENTS

| | | | |
|---|---|---|---|
| 11,172,531 B2 | 11/2021 | Raghavan et al. | |
| 2020/0314934 A1* | 10/2020 | Raghavan | H04W 76/15 |
| 2021/0400694 A1* | 12/2021 | Zhu | H04W 72/1268 |
| 2022/0216937 A1* | 7/2022 | Veerashetty | H04L 1/0023 |
| 2022/0360301 A1 | 11/2022 | Park et al. | |
| 2022/0407583 A1* | 12/2022 | Raghavan | H04B 7/0695 |
| 2023/0231640 A1* | 7/2023 | Balevi | H04B 7/0426 |
| | | | 370/329 |

OTHER PUBLICATIONS

International Search Report and Written Opinion—PCT/US2024/027051—ISA/EPO—Aug. 29, 2024.
Tsen W.F., et al., "Correlations and Channel Capacities for Multi-Polarized MIMO Systems", IEEE 20th International Symposium on Personal, Indoor and Mobile Radio Communications (PIMRC 2009), IEEE, Piscataway, NJ, USA, Sep. 13, 2009, pp. 1069-1073, XP031660034, abstract, pp. 3,4, figures 1,2,3.

* cited by examiner

*Primary Examiner* — Tejis Daya
(74) *Attorney, Agent, or Firm* — QUALCOMM Incorporated

(57) ABSTRACT

Various aspects of the present disclosure generally relate to wireless communication. In some aspects, a user equipment (UE) may transmit a first indication of a multiple-input-multiple-output (MIMO) configuration threshold that is associated with a selection between a polarization MIMO configuration and a spatial MIMO configuration, the MIMO configuration threshold being based at least in part on a performance threshold. The UE may receive a second indication of a MIMO communication configuration that specifies the selection. Numerous other aspects are described.

30 Claims, 11 Drawing Sheets

FIG. 4A

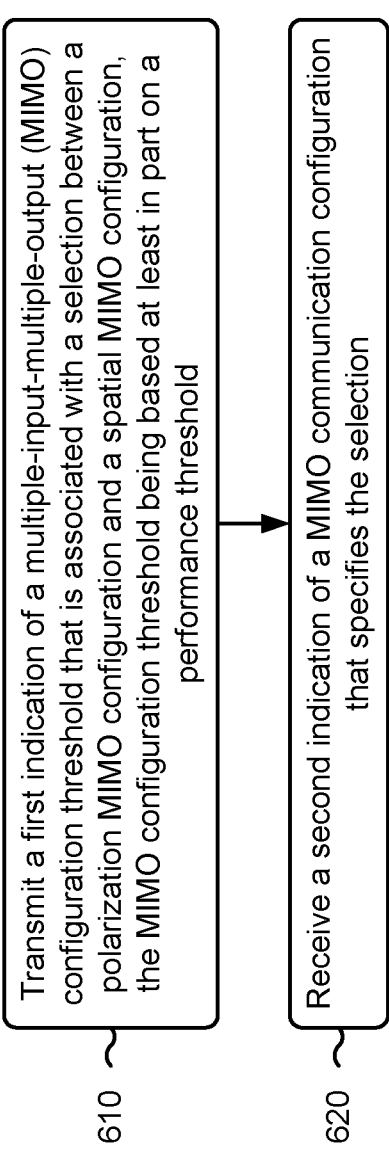

Transmit a first indication of a multiple-input-multiple-output (MIMO) configuration threshold that is associated with a selection between a polarization MIMO configuration and a spatial MIMO configuration, the MIMO configuration threshold being based at least in part on a performance threshold

610

Receive a second indication of a MIMO communication configuration that specifies the selection

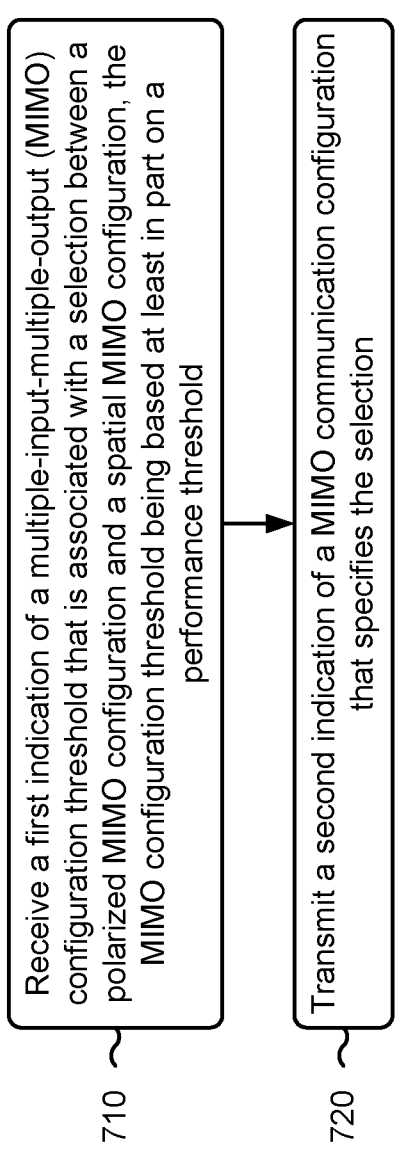

Receive a first indication of a multiple-input-multiple-output (MIMO) configuration threshold that is associated with a selection between a polarized MIMO configuration and a spatial MIMO configuration, the MIMO configuration threshold being based at least in part on a performance threshold

710

Transmit a second indication of a MIMO communication configuration that specifies the selection

SWITCHING BETWEEN POLARIZATION AND SPATIAL MULTIPLE-INPUT-MULTIPLE-OUTPUT BASED ON A MULTIBAND ANTENNA

FIELD OF THE DISCLOSURE

Aspects of the present disclosure generally relate to wireless communication and to techniques and apparatuses for switching between polarization and spatial multiple-input-multiple-output (MIMO) based on a multiband antenna.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting a first indication of a multiple-input-multiple-output (MIMO) configuration threshold that is associated with a selection between a polarization MIMO configuration and a spatial MIMO configuration, the MIMO configuration threshold being based at least in part on a performance threshold. The method may include receiving a second indication of a MIMO communication configuration that specifies the selection.

Some aspects described herein relate to a method of wireless communication performed by a network node. The method may include receiving a first indication of a MIMO configuration threshold that is associated with a selection between a polarized MIMO configuration and a spatial MIMO configuration, the MIMO configuration threshold being based at least in part on a performance threshold. The method may include transmitting a second indication of a MIMO communication configuration that specifies the selection.

Some aspects described herein relate to an apparatus for wireless communication at a UE. The apparatus may include a memory and one or more processors coupled to the memory. The one or more processors may be configured, individually or collectively, to cause the UE to transmit a first indication of a MIMO configuration threshold that is associated with a selection between a polarization MIMO configuration and a spatial MIMO configuration, the MIMO configuration threshold being based at least in part on a performance threshold. The one or more processors may be configured, individually or collectively, to cause the UE to receive a second indication of a MIMO communication configuration that specifies the selection.

Some aspects described herein relate to an apparatus for wireless communication at a network node. The apparatus may include a memory and one or more processors coupled to the memory. The one or more processors may be configured, individually or collectively, to cause the network node to receive a first indication of a MIMO configuration threshold that is associated with a selection between a polarized MIMO configuration and a spatial MIMO configuration, the MIMO configuration threshold being based at least in part on a performance threshold. The one or more processors may be configured, individually or collectively, to cause the network node to transmit a second indication of a MIMO communication configuration that specifies the selection.

Some aspects described herein relate to a non-transitory computer-readable medium that stores a set of instructions for wireless communication by a UE. The set of instructions, when executed by one or more processors of the UE, may cause the UE to transmit a first indication of a MIMO configuration threshold that is associated with a selection between a polarization MIMO configuration and a spatial MIMO configuration, the MIMO configuration threshold being based at least in part on a performance threshold. The set of instructions, when executed by one or more processors of the UE, may cause the UE to receive a second indication of a MIMO communication configuration that specifies the selection.

Some aspects described herein relate to a non-transitory computer-readable medium that stores a set of instructions for wireless communication by a network node. The set of instructions, when executed by one or more processors of the network node, may cause the network node to receive a first indication of a MIMO configuration threshold that is associated with a selection between a polarized MIMO configuration and a spatial MIMO configuration, the MIMO configuration threshold being based at least in part on a performance threshold. The set of instructions, when executed by one or more processors of the network node, may cause the network node to transmit a second indication of a MIMO communication configuration that specifies the selection.

Some aspects described herein relate to an apparatus for wireless communication. The apparatus may include means for transmitting a first indication of a MIMO configuration threshold that is associated with a selection between a polarization MIMO configuration and a spatial MIMO configuration, the MIMO configuration threshold being based at least in part on a performance threshold. The apparatus may include means for receiving a second indication of a MIMO communication configuration that specifies the selection.

Some aspects described herein relate to an apparatus for wireless communication. The apparatus may include means for receiving a first indication of a MIMO configuration threshold that is associated with a selection between a polarized MIMO configuration and a spatial MIMO configuration, the MIMO configuration threshold being based at least in part on a performance threshold. The apparatus may include means for transmitting a second indication of a MIMO communication configuration that specifies the selection.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4A, 4B, and 4C are diagrams illustrating a first example of a multiband antenna module, a second example of correlation coefficient charts based at least in part on a carrier frequency and angular spread, and a third example of MIMO performance versus frequency charts, respectively, in accordance with the present disclosure.

FIG. 6 is a diagram illustrating an example process performed, for example, by a UE, in accordance with the present disclosure.

FIG. 7 is a diagram illustrating an example process performed, for example, by a network node, in accordance with the present disclosure.

DETAILED DESCRIPTION

Figure 1:
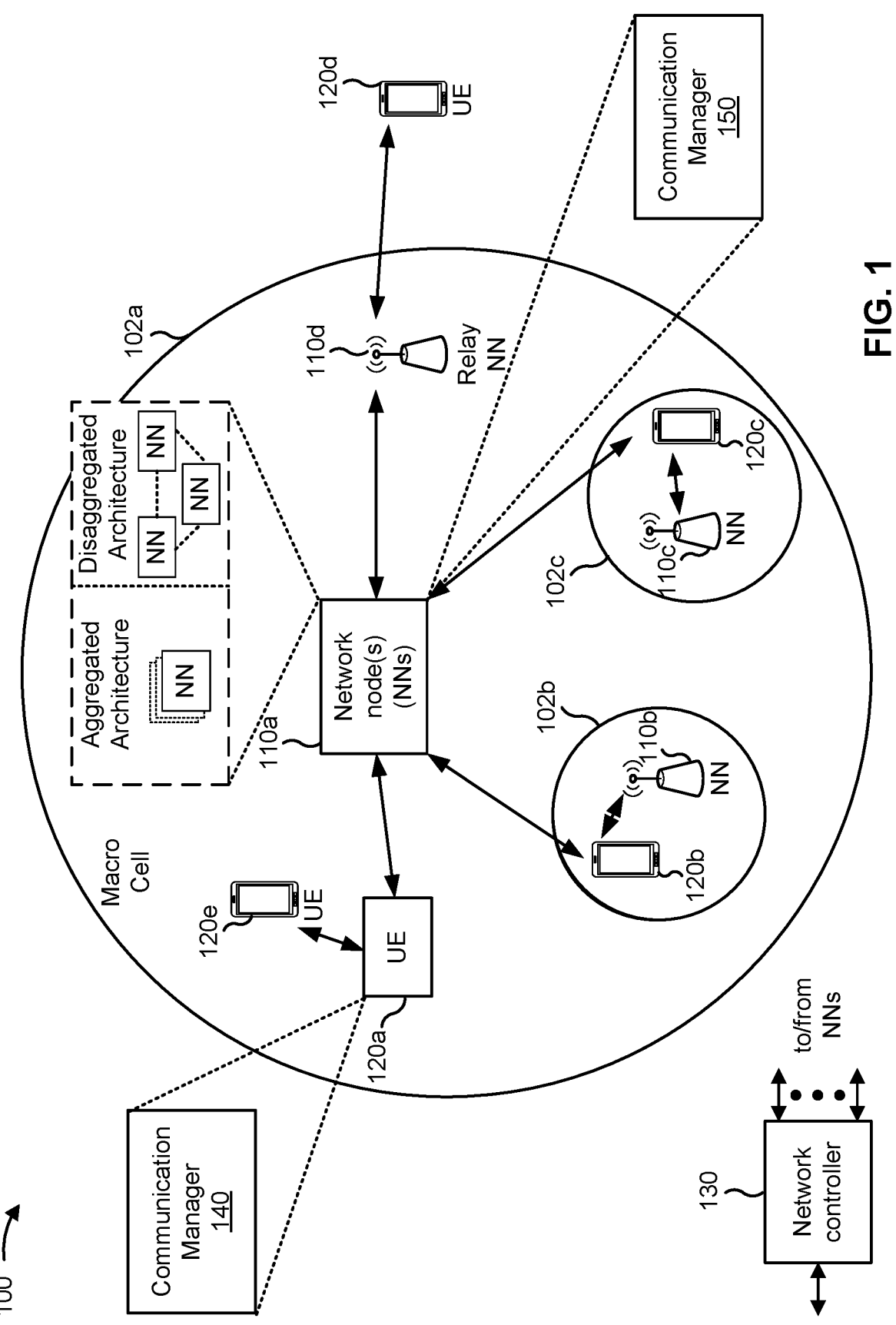
FIG. 1 is a diagram illustrating an example of a wireless network, in accordance with the present disclosure.

Transmitter and/or receiver hardware that is used to communicate using the higher frequencies may have a different configuration relative to transmitter and/or receiver hardware that is used to communicate using the lower frequencies, such as different antenna lengths and/or different impedance matching circuits. Accordingly, the different hardware may process a same carrier frequency differently. A (single) multiband antenna module may support multiple frequency bands and simplify device control of switching between the different frequency bands. A multiband antenna module, such as a multiband antenna module at a user equipment (UE), may process a multiple-input-multiple-output (MIMO) communication differently at different carrier frequencies. Without information that indicates which MIMO configuration provides better performance, a network node scheduling and/or configuring a MIMO communication for the UE may select a MIMO configuration with less performance, resulting in increased data recovery errors, decreased data throughput, and/or decreased signal quality (e.g., increased distortion, reduced signal power, and/or increased interference). Alternatively, or additionally, without the information that indicates a MIMO configuration performance, configuring a multi-layer MIMO communication may add signaling overhead by the network node, especially when switching carrier frequencies. The increased signaling overhead may reduce data throughput and/or increase data-transfer latencies in a wireless network.

Some techniques and apparatuses described herein provide for switching between polarization and spatial MIMO based on a multiband antenna module. In some aspects, a UE may transmit a first indication of a MIMO configuration threshold that is associated with a selection between a polarization MIMO configuration and a spatial MIMO configuration. The MIMO configuration threshold may be based at least in part on a performance threshold, such as a spectral efficiency threshold or a data rate threshold condition. Based at least in part on transmitting the first indication, the UE may receive a second indication of a MIMO communication configuration that specifics the selection.

The indication of a MIMO configuration performance may enable a network node to select a MIMO configuration that improves a performance of the MIMO communication (e.g., an increased data rate and/or an increased spectral efficiency) relative to other MIMO configurations. Selecting a MIMO configuration that improves a performance of the MIMO communication may result in an increased signal quality (e.g., decreased distortion, increased signal power, and/or decreased interference), decreased data recovery errors, and/or increased data throughput. Alternatively, or additionally, the indication of the MIMO configuration performance may enable the network node to reduce signaling overhead, resulting in increased data throughput and/or reduced data-transfer latencies in the wireless network.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120c), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 Megahertz (MHz)-7.125 Gigahertz (GHz)) and FR2 (24.25 GHZ-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include midband frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may transmit a first indication of a MIMO configuration threshold that is associated with a selection between a polarization MIMO configuration and a spatial MIMO configuration, the MIMO configuration threshold being based at least in part on a performance threshold; and receive a second indication of a MIMO communication configuration that specifies the selection. Additionally, or alternatively, the communication manager 140 may perform one or more other operations described herein.

In some aspects, a network node (e.g., the network node 110) may include a communication manager 150. As described in more detail elsewhere herein, the communication manager 150 may receive a first indication of a MIMO configuration threshold that is associated with a selection between a polarized MIMO configuration and a spatial MIMO configuration, the MIMO configuration threshold being based at least in part on a performance threshold; and transmit a second indication of a MIMO communication configuration that specifies the selection. Additionally, or alternatively, the communication manager 150 may perform one or more other operations described herein.

As indicated above, FIG. 1 is provided as an example. Other examples may differ from what is described with regard to FIG. 1.

Figure 2:
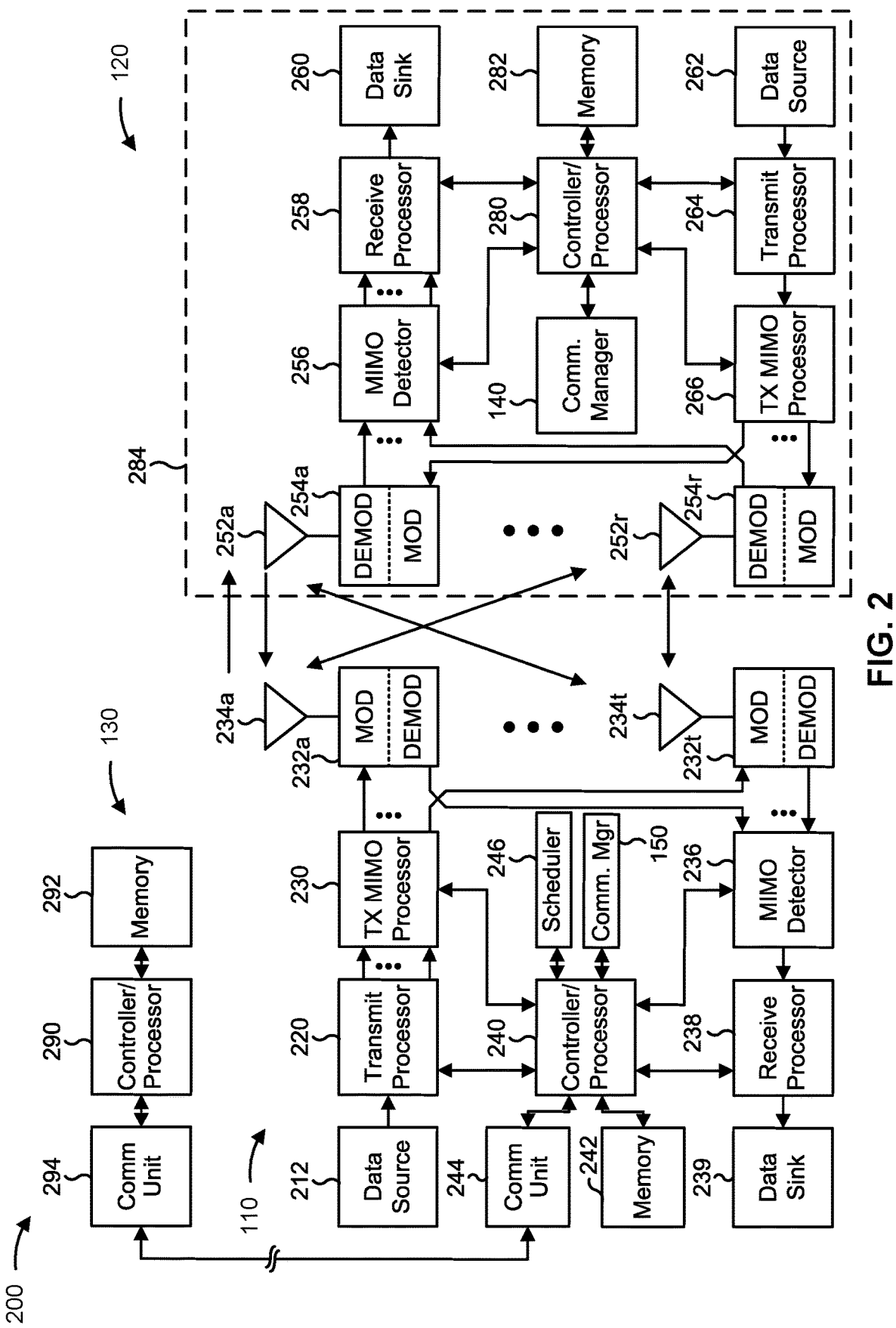
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) MIMO processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3A-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3A-9).

The controller/processor 240 of the network node 110, the controller/processor 280 of the UE 120, and/or any other component(s) of FIG. 2 may perform one or more techniques associated with switching between polarization and spatial MIMO based on a multiband antenna module, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE (e.g., the UE 120) includes means for transmitting a first indication of a MIMO configuration threshold that is associated with a selection between a polarization MIMO configuration and a spatial MIMO configuration, the MIMO configuration threshold being based at least in part on a performance threshold; and/or means for receiving a second indication of a MIMO communication configuration that specifies the selection. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for receiving a first indication of a MIMO configuration threshold that is associated with a selection between a polarized MIMO configuration and a spatial MIMO configuration, the MIMO configuration threshold being based at least in part on a performance threshold; and/or means for transmitting a second indication of a MIMO communication configuration that specifies the selection. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (CNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figures 3A, 3B:
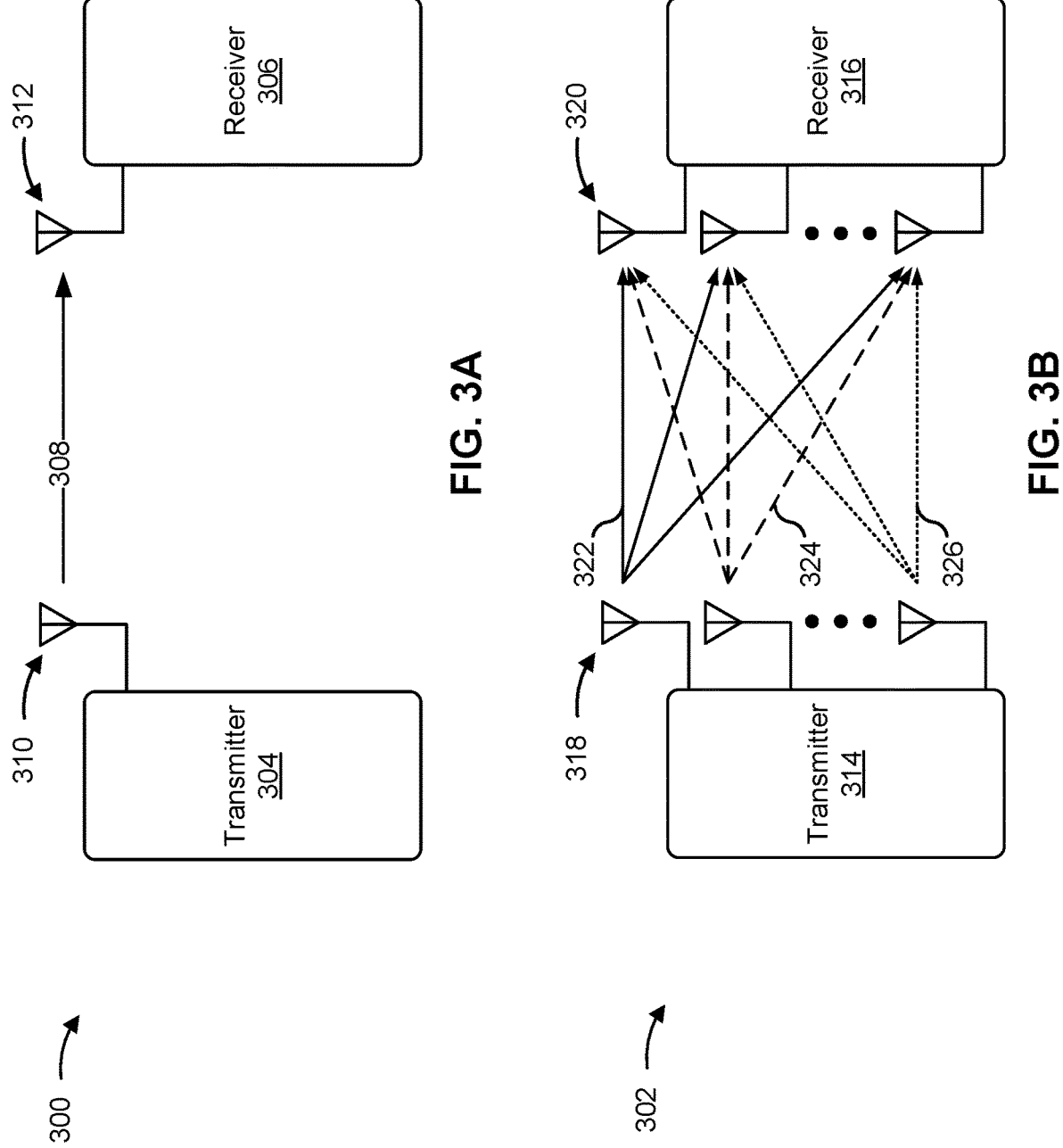
FIGS. 3A and 3B are diagrams illustrating a first example and a second example of a single-input-single-output system and a multiple-input-multiple-output (MIMO) system, respectively, in accordance with the present disclosure.

FIGS. 3A and 3B are diagrams illustrating a first example 300 and a second example 302 of a single-input-single-output (SISO) system and a MIMO system, respectively, in accordance with the present disclosure.

The first example 300 shown by FIG. 3A includes a transmitter device 304 (e.g., a network node 110 and/or a UE 120) that wirelessly communicates with a receiver device 306 (e.g., a network node 110 and/or a UE 120) based at least in part on transmitting a wireless signal 308. In the first example 300, the transmitter device 304 includes a first (single) antenna 310 that is used to transmit the wireless signal 308, and the receiver device includes a second (single) antenna 312 to receive the wireless signal 308. In some aspects, the transmitter device 304 and the receiver device 306 may be configured as a SISO system based at least in part on each device using a single (respective) antenna for transmission and/or reception.

The second example 302 shown by FIG. 3B includes a transmitter device 314 (e.g., a network node 110 and/or a UE 120) and a receiver device 316 (e.g., a network node 110 and/or a UE 120) that wirelessly communicate with one another based at least in part on multiple antennas. To illustrate, the transmitter device 314 may include M antennas as shown by reference number 318, and the receiver device 316 may include N antennas as shown by reference number 320, where M and N are integers that may be equal or different from one another (e.g., M=N, M>N, and/or M<N). In some aspects, each antenna of the transmitter device 314 may transmit respective data based at least in part on using spatial diversity and/or polarization diversity. As one non-limiting example, a first antenna may transmit a first signal 322 (shown with a solid line), a second antenna may transmit a second signal 324 (shown with a dashed line), up to an M-th antenna that transmits an M-th signal 326 (shown with a dotted line). Relative to a SISO transmission, a MIMO transmission may increase data throughput based at least in part on the ability to transmit different data streams based at least in part on using diverse signals. To illustrate, the transmitter device 314 may generate the diverse signals using spatial multiplexing and/or polarization multiplexing.

"Spatial multiplexing" may denote generating spatially diverse signal transmissions. To illustrate, and as described above, the transmitter device 314 may apply precoding to a first signal that is based at least in part on a first carrier frequency such that the first signal propagates in a first direction with a first spatial beamwidth. That is, the transmitter device 314 may beamform the first signal based at least in part on a first propagation direction and/or a first spatial beamwidth. In some aspects, the first signal carries first data. Alternatively, or additionally, the transmitter device 314 may apply precoding to a second signal that is based at least in part on a second carrier frequency (e.g., that may be the same carrier frequency as the first carrier frequency or a different carrier frequency from the first carrier frequency) such that the second signal propagates in a second direction with a second spatial beamwidth. In some aspects, the second signal may carry second data that is different from the first data. The transmitter device 314 may select the second propagation direction and/or the second spatial beamwidth to mitigate and/or avoid overlap with the first propagation direction and/or the first spatial beamwidth. That is, the first signal and the second signal may be spatially diverse based at least in part on propagating in non-overlapping directions with non-overlapping spatial beamwidths (or partially overlapping directions and/or spatial beamwidths).

"Polarization multiplexing" may denote transmitting at least two signals that have diverse polarizations. To illustrate, an electromagnetic (EM) wave may include an electric field (E-field) and magnetic field (H-field) that propagate along a same propagation line (e.g., a same direction) and are perpendicular to one another. For example, in an XYZ coordinate system that is characterized by an X-plane, a Y-plane, and a Z-plane that are perpendicular to one another, the E-field of the EM wave is separated from the H-field by 90 degrees. Accordingly, if an E-field that propagates along an X-axis with an amplitude that varies along the Y-axis (e.g., within a horizontal X-Y plane), the H-field may also propagate along the X-axis with an amplitude that varies along the Z-axis (e.g., in a perpendicular, vertical X-Z plane). In linear polarization, the E-field and the H-field may propagate without rotating around the propagation line, while in circular polarization, the E-field and the H-field may rotate around the propagation line. In some aspects, the transmitter device 314 may transmit a first signal that is based at least in part on a first carrier frequency and a first polarization. Alternatively, or additionally, the transmitter device 314 may transmit a second signal that is based at least in part on a second carrier frequency (e.g., that may be the same carrier frequency as the first carrier frequency or a different carrier frequency from the first carrier frequency) and a second polarization that is orthogonal to the first polarization. That is, the first signal and the second signal may have diverse polarizations. For example, the E-field of the first signal is orthogonal to the E-field of the second signal, and the H-field of the first signal is orthogonal to the H-field of the second signal. In some aspects, the first signal may carry first data, and the second signal may carry second data that is different from the first data. To illustrate, the transmitter device 314 may include at least a first antenna that is configured to generate a first signal that has a first polarization and a second antenna that is configured to generate a second signal that has a second polarization.

The demand for services provided by a wireless network continues to increase as more and more devices access the wireless network. The availability of communication resources (e.g., frequency resources and/or time resources) to provide these services becomes proportionally strained as the number of devices accessing the wireless network increases. As an added complexity, some devices may request increased data throughput and/or lower data-transfer latency relative to other devices, such as when a device executes an application that consumes large quantities of data and/or has time-sensitive needs (e.g., streaming video, streaming audio, video calling, gaming, and/or emergency services). MIMO communications may help increase data throughput based at least in part on transmitting multiple data streams using diverse signals. Another solution to addressing the demand for more communication resources may include using higher frequencies, such as higher frequency bands that are included in FR2.

Transmitter and/or receiver hardware that is used to communicate using the higher frequencies may have a different configuration relative to transmitter and/or receiver hardware that is used to communicate using the lower frequencies. As one example, a first antenna module that is designed for a lower frequency may differ from a second antenna module that is designed for a higher frequency. To illustrate, the first antenna module may utilize a different inter-antenna element spacing and/or have a different impedance matching circuit relative to the second antenna module to maximize an amount of power transferred through the antenna. That is, the first antenna module and the second antenna module may utilize different hardware configurations to improve a quality of a transmitted and/or received signal (e.g., increased signal power and/or reduced distortion).

Supporting multiple frequency bands based at least in part on multiple antenna modules (e.g., frequency-band specific antenna modules) may be expensive in terms of cost, design, space, and/or real-estate (e.g., at the UE side). To illustrate, designing multiple antenna modules may increase a design time and/or increase an amount of hardware included in a wireless computing device and, subsequently, increase a cost associated with the wireless computing device. In some aspects, the wireless computing device, such as a UE 120, may have less space relative to other wireless computing device to include multiple antenna modules. Alternatively, or additionally, control of multiple antenna modules may introduce more complexity that increases an amount of overhead processing at the UE. To compensate for a lack of space and simplify antenna control, some wireless communication devices may include a (single) multiband antenna module that supports multiple frequency bands. The inclusion of a multiband antenna module may enable a wireless communication device to wirelessly communicate over a larger range of frequencies relative to a single antenna module that is configured for a particular frequency band while meeting space constraints of smaller wireless communication devices.

An antenna module, whether a single band antenna module or a multiband antenna module, may process a MIMO communication differently at different carrier frequencies. To illustrate, and as further described below with regard to FIGS. 4A, 4B, and 4C, the correlation between antenna elements of an antenna module at a UE may result in a spatial MIMO configuration having better performance (e.g., a higher data rate and/or increased spectral efficiency) relative to a polarized MIMO configuration at a first carrier frequency. "Spatial MIMO configuration" may refer to spatial multiplexing of at least two signals over two independent spatial layers across different steered beamforming directions and/or other beamforming vectors suitable designed for this MIMO configuration, and "polarization MIMO configuration" may refer to polarization multiplexing of at least two signals over two independent and/or orthogonal polarization layers across the same and or commensurate (e.g., within a range of values and/or within a direction threshold) steered beamforming direction or via other beamforming vectors suitably designed for this configuration. At a second carrier frequency, however, the correlation between the antenna elements may result in the polarized MIMO configuration having better performance relative to a spatial MIMO configuration. Further, different UEs may include different antenna modules with varying performance results, such that the first carrier frequency at a second, different UE (e.g., with a different antenna module) may result in the polarized MIMO configuration having better performance relative to the spatial MIMO configuration. Without information that indicates which MIMO configuration provides better performance, a network node 110 scheduling and/or configuring a MIMO communication for the UE 120 may select a MIMO configuration with less performance, resulting in increased data recovery errors, decreased data throughput, and/or decreased signal quality (e.g., increased distortion, reduced signal power, and/or increased interference). Alternatively, or additionally, configuring a multi-layer MIMO communication may add signaling overhead. To illustrate, a network node 110 may configure a 2-layer polarization MIMO communication based at least in part on a single transmission configuration indicator (TCI) state and a 4-layer spatial MIMO communication based at least in part on two TCI states. Without information that indicates which MIMO configuration provides better performance, a network node 110 scheduling and/or configuring a MIMO communication for the UE 120 may select a MIMO communication configuration that leads to an increase in signaling overhead. The signaling overhead may be compounded based at least in part on frequency switching that leads to reconfigurations of a MIMO communication configuration. Increased signaling overhead may reduce data throughput and/or increase data-transfer latencies in a wireless network. Alternatively, or additionally, configuring polarized MIMO and/or two TCI states based at least in part on a rank indicator (RI) may also increase signaling overhead.

Some techniques and apparatuses described herein provide for switching between polarization and spatial MIMO based on a multiband antenna module. In some aspects, a UE may transmit a first indication of a MIMO configuration threshold that is associated with a selection between a polarization MIMO configuration and a spatial MIMO configuration. The MIMO configuration threshold may be based at least in part on a performance threshold, such as a spectral efficiency threshold or a data rate threshold. To illustrate, the MIMO configuration threshold may indicate a performance of a polarization MIMO configuration and/or a spatial MIMO configuration based at least in part on a carrier frequency. Based at least in part on transmitting the first indication, the UE may receive a second indication of a MIMO communication configuration that specifies the selection. For example, a network node may select the MIMO communication configuration based at least in part on a carrier frequency associated with a MIMO communication configuration between the network node and the UE.

A UE may indicate a performance of a spatial MIMO configuration and/or a polarization MIMO configuration that is based at least in part on a carrier frequency and/or an angular spread as described below. The indication of a MIMO configuration performance may enable a network node to select a MIMO configuration that improves a performance of the MIMO communication (e.g., an increased data rate and/or an increased spectral efficiency) relative to other MIMO configurations. Selecting a MIMO configuration that improves a performance of the MIMO communication may result in an increased signal quality (e.g., decreased distortion, increased signal power, and/or decreased interference), decreased data recovery errors, and/ or increased data throughput. Alternatively, or additionally, the indication of the MIMO configuration performance may enable the network node to reduce signaling overhead based at least in part on frequency selection and/or a MIMO configuration selection. Reducing signaling overhead may increase data throughput and/or reduce data-transfer latencies in the wireless network.

As indicated above, FIGS. 3A and 3B are provided as examples. Other examples may differ from what is described with regard to FIGS. 3A and 3B.

Figure 4A:
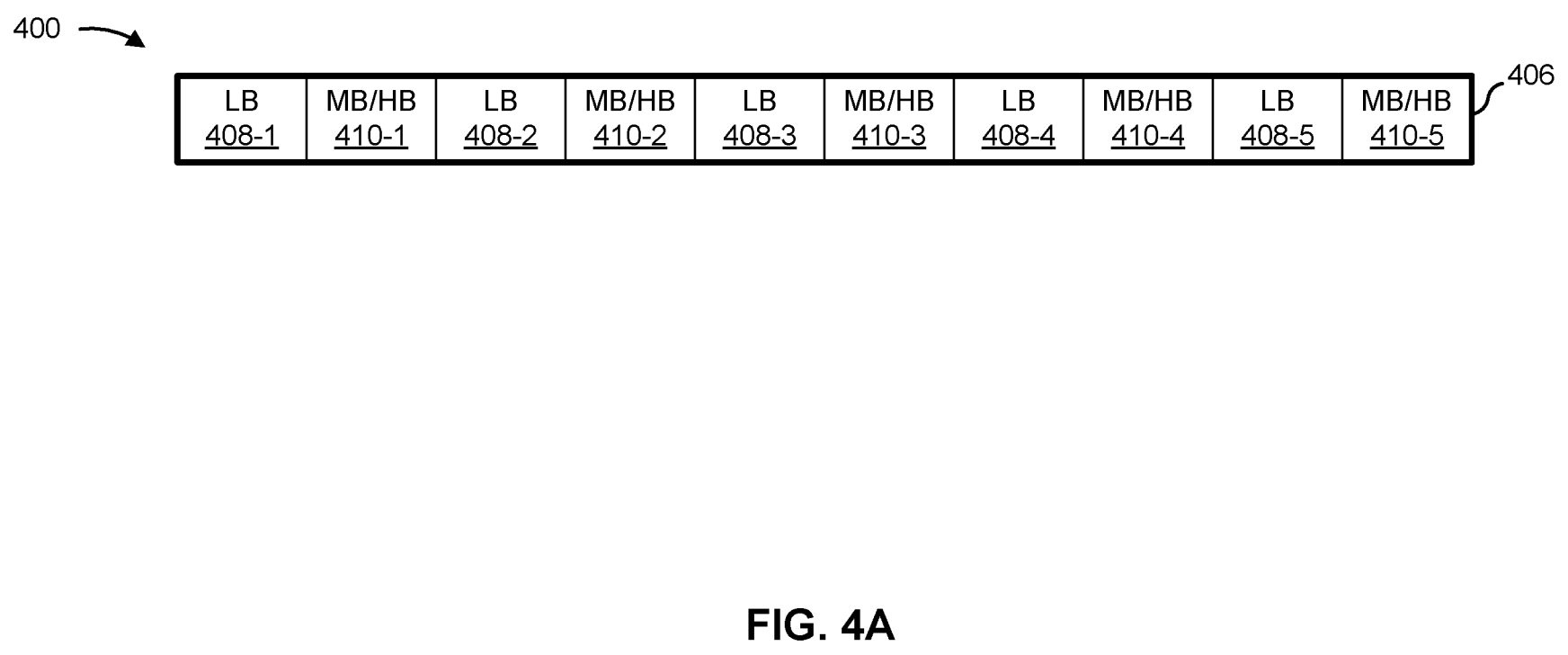
Figure 4B:
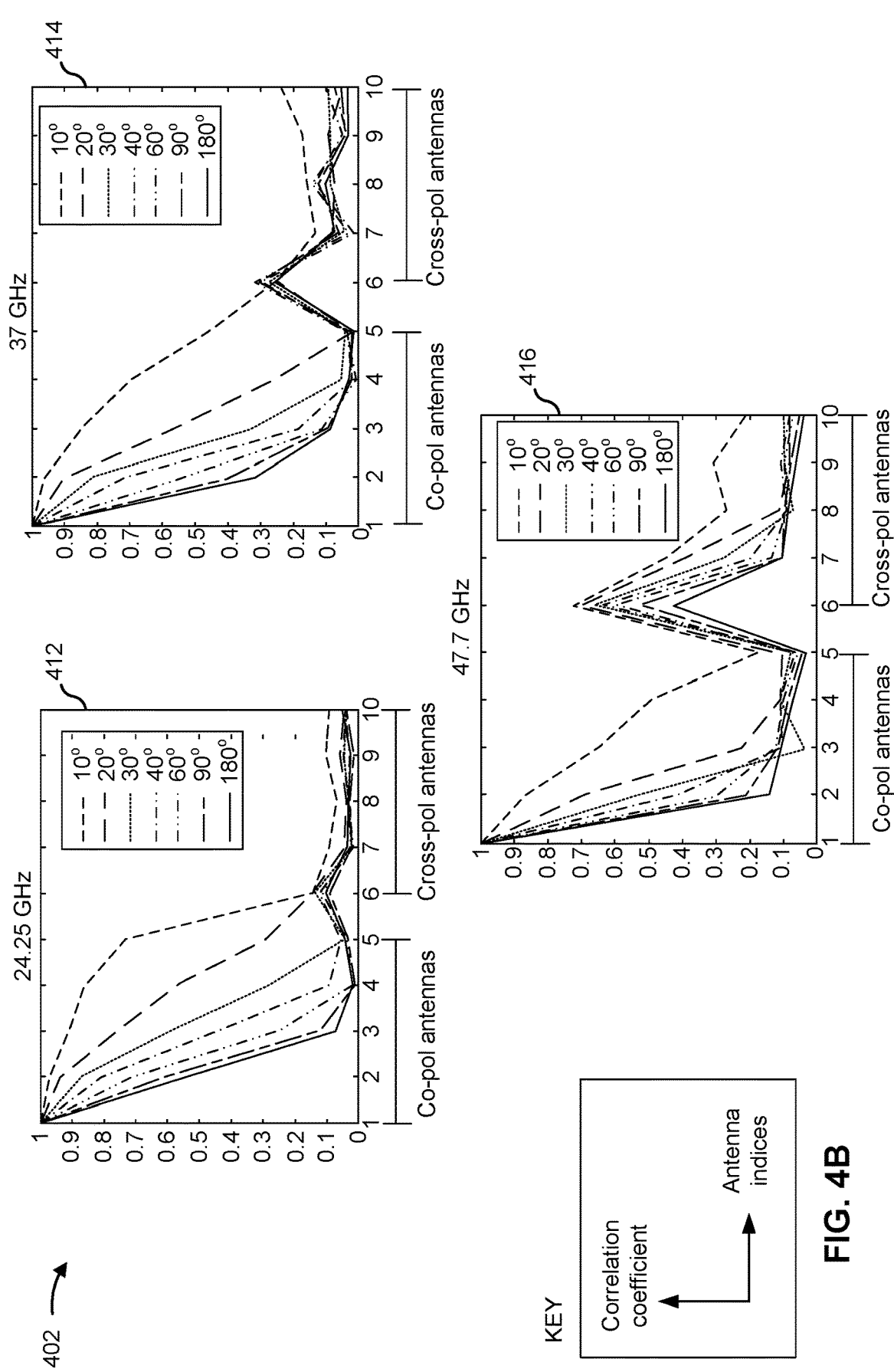
Figure 4C:
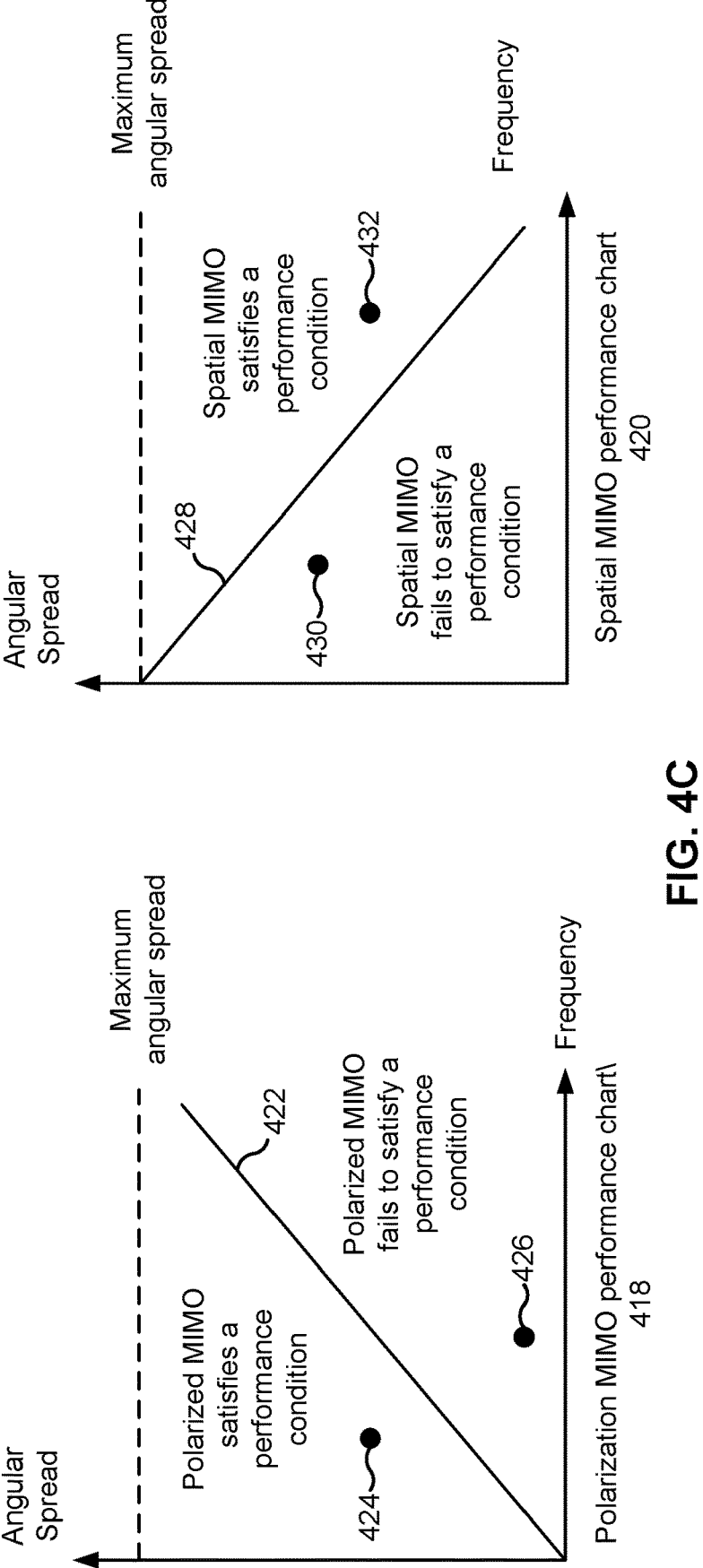

FIGS. 4A, 4B, and 4C are diagrams illustrating a first example 400 of a multiband antenna module, a second example 402 of correlation coefficient charts based at least in part on a carrier frequency and angular spread, and a third example 404 of MIMO performance versus frequency charts, respectively, in accordance with the present disclosure.

FIG. 4A includes an antenna module component 406 that includes multiband capabilities. That is, the antenna module component 406 may be configured as a multiband antenna module that is capable of transmitting and/or receiving wireless communications over a range of frequency bands (e.g., in FR1 and/or FR2), such as a low-band (LB) that spans 24.25-29.5 GHZ, a mid-band (MB) that spans 37-43.5 GHZ, and a high-band (HB) that spans 47.2-48.2 GHZ. In some aspects, the antenna module component 406 may include multiple frequency band-specific antenna components, such as multiple LB antenna components, multiple MB antenna components, and/or multiple HB antenna components. In one example, and as shown by FIG. 4A, the antenna module component 406 includes a first set of LB antenna components (shown as LB antenna component 408-1, LB antenna component 408-2, LB antenna component 408-3, LB antenna component 408-4, and LB antenna component 408-5) and a second set of MB/HB antenna components (shown as MB/HB antenna component 410-1, MB/HB antenna component 410-2. MB/HB antenna component 410-3, MB/HB antenna component 410-4, and MB/HB antenna component 410-5). Accordingly, a device that includes the antenna module component 406, such as a UE 120, may transmit and/or receive wireless communications in an LB based at least in part on the LB antenna components, and transmit and/or receive wireless communications in an MB and/or an HB based at least in part on the MB/HB antenna components. To illustrate, the first set of LB antenna components may act as a first antenna array, and the second set of MB/HB antenna components may act as a second antenna array. Each antenna component, such as the LB antenna component 408-1 and/or the MB/HB antenna component 410-1, may include one or more antennas, such as a first antenna with a first polarization and/or orientation (e.g., vertical) and a second antenna with a second polarization and/or orientation (e.g., horizontal).

An isolation and/or independence of antenna elements from one another may affect a signal quality of a MIMO communication. To illustrate, two antennas that have high isolation and/or independence from one another may have radiation patterns that differ from one another and/or are uncorrelated. Conversely, two antennas that have low isolation and/or low independence from one another may have radiation patterns that are similar (e.g., each has a propagation direction that is within a direction difference threshold and/or a spatial width that is within a width difference threshold). Accordingly, two antennas with high isolation and/or high independence may be more suitable for a spatial MIMO communication based at least in part on the isolation of the antennas being able to mitigate spatial overlap of two signals. Alternatively, or additionally, two antennas with low isolation and/or low independence from one another may be more suitable for a polarization MIMO communication based at least in part on the dependence and/or correlation between the two antennas, thus allowing for an increased coherent energy transfer performed by the antennas.

In statistics, a correlation coefficient is a measure of a relationship and/or dependence between two variables. For two antennas, a correlation coefficient may be calculated based at least in part on a variety of factors, such as a physical distance between the antenna elements, a carrier frequency for a communication using the antennas, a polarization intended by each antenna, and/or a signal power level of each antenna. As one example, a correlation between a first variable X and a second variable Y may be calculated based at least in part on:

$$\text{Correlation}_{X,Y} = \text{Covariance}(X,Y)/\sigma_X{}^*\sigma_Y \qquad (1)$$

FIG. 4B includes a first correlation coefficient chart 412 that is associated with a first frequency (e.g., 24.25 GHz), a second correlation coefficient chart 414 that is associated with a second frequency (e.g., 37 GHZ) and a third correlation coefficient chart 416 that is associated with a third frequency (e.g., 47.7 GHZ). Each correlation coefficient chart is based at least in part on a set of antenna elements (shown on a horizontal axis). In some aspects, each correlation coefficient chart may be based at least in part on the antenna module component 406 as described with regard to FIG. 4A.

The set of antenna elements include a first subset of co-polarized antenna elements and a second subset of cross-polarized antenna elements. That is, the antenna elements included in the first subset are co-polarized with one another, and the antenna elements included in the second subset are co-polarized with one another, but the first subset and the second subset are cross-polarized with one another. A vertical axis of each correlation coefficient chart represents a correlation coefficient that is calculated between two antennas. To illustrate, the set of antenna elements may include 10 antenna elements that are labeled as "1", "2", up to "10". The first sub-set of co-polarized antenna elements may include the antenna elements that are labeled from 1-5, and the second subset of cross-polarized antenna elements may include the antenna elements that are labeled from 6-10. Each correlation coefficient is based at least in part on an antenna pairing between a reference antenna element (e.g., antenna 1) and each respective other antenna element in the set (e.g., antennas 2-10).

In FIG. 4B, a labeling of each antenna is based at least in part on an inter-antenna element spacing and/or distance between antenna elements. That is, for a reference antenna labeled as antenna 1, a second antenna with an increase in number indicates a larger distance from the reference antenna. For example, the reference antenna (e.g., antenna 1) and antenna 2 of the first set of co-polarized antennas may be separated by a distance from one another, such as a first distance between LB antenna component 408-1 and LB antenna component 408-2 and/or a second distance between MB/HB antenna component 410-1 and MB/HB antenna component 410-2. Antenna 3 (e.g., LB antenna component 408-3 and/or MB/HB antenna component 410-3) may be separated from antenna 2 by the same distance but may be separated from the reference antenna by twice the distance. Accordingly, for the first sub-set of co-polarized antennas, antenna 2 may be closest to the reference antenna relative to antennas 3, 4, and 5, and antenna 5 may be separated from the reference antenna by a larger distance than antennas 2, 3, and 4. Alternatively, or additionally, two cross-polarized antennas may be included in a same antenna component (e.g., the LB antenna component 408-1 or the MB/HB antenna component 410-1). For example, antenna 1 and antenna 6, which are cross-polarized with one another, may be included in a first antenna component, and antenna 2 and antenna 7 may be included in a second antenna component. In FIG. 4B, antenna 6 is a second reference antenna with regard to the second set of cross-polarized antennas. Accordingly, a labeling of each antenna in the second set of cross-polarized antennas (e.g., cross-polarized with the first set of co-polarized antennas) is based at least in part on an inter-antenna element spacing. Each correlation coefficient chart also includes, for each antenna pairing, a correlation coefficient that is based at least in part on a respective angular spread (e.g., 10°, 20°, 30°. 40°, 60°, 90° and 180° in elevation and an azimuth that covers 0°-360°) associated with a dominant cluster in a communication channel. "Dominant cluster" may denote a group of paths and/or rays associated with an object in the channel environment with commensurate properties (e.g., a propagation path and/or a spatial beamwidth that are within a threshold and/or within a range of one another) that form a majority of signal propagation from that object in the communication channel. A correlation coefficient with a value of "1" indicates a high correlation between the antenna pairing and a correlation coefficient with a value of "0" indicates a low correlation between the antenna pairing.

As shown by the correlation coefficient charts of FIG. 4B (e.g., the first correlation coefficient chart 412, the second correlation coefficient chart 414, and the third correlation coefficient chart 416), a correlation of co-polarized antennas may reduce as the frequency increases and/or the inter-antenna element spacing increases. That is, a correlation between the reference antenna element (e.g., antenna 1) and other antennas with a same polarization (e.g., antennas 2-5) trends downward with less correlation as the frequency and/or separation distance increases. As also shown by the correlation coefficient charts, a correlation of the reference antenna with cross-polarized antenna(s) may increase and/or trend upwards (e.g., have higher correlation) as the frequency increases. Alternatively, or additionally, the correlation coefficient charts may indicate that a correlation between co-polarized antenna elements may decrease as an angular spread of the dominant cluster in the communication channel increases (e.g., due to averaging effects).

The above observations associated with the first correlation coefficient chart 412, the second correlation coefficient chart 414, and the third correlation coefficient chart 416 (e.g., a downward trend in correlation for co-polarized antenna elements as frequency increases, an upward trend in correlation between cross-correlation antenna elements as the frequency increases, and/or a downward trend in correlation as an angular spread of a dominant cluster increases) may differ based at least in part on a variety of factors, such as antenna design, a distance between antenna elements, antenna placement, antenna design, and/or one or more supported carrier frequencies. That is, the first correlation coefficient chart 412, the second correlation coefficient chart 414, and the third correlation coefficient chart 416 provide a correlation coefficient analysis for a same antenna module component (e.g., the antenna module component 406) at three carrier frequencies, and the above observations may differ for other frequencies and/or other antenna module components.

MIMO communications may include multiple layers, and each layer may be associated with a respective data stream.

To illustrate, a 2-layer MIMO communication may include two data streams and a 4-layer MIMO communication may include four data streams. A 2-layer polarization MIMO communication may transmit a first data stream based at least in part on a first signal that has a first polarization, and a second data stream based at least in part on a second signal that has a second polarization (e.g., that is orthogonal to the first polarization). A 4-layer spatial MIMO communication may transmit each data stream of four data streams based at least in part on a respective beam of four beams that do not spatially overlap.

As shown by FIG. 4B, the first correlation coefficient chart 412 may indicate that polarization MIMO is suitable (e.g., polarization MIMO may mitigate data recovery errors) at multiple angular spreads for lower frequencies (e.g., 24.25 GHZ). To illustrate, at a carrier frequency of 24.25 GHZ, antennas that are adjacent and/or close (e.g., within a distance threshold) to the reference antenna have a correlation coefficient of 0.7 or greater for each angular spread (e.g., 10°, 20°, 30°, 40°, 60°, 90° and 180°). That is, the correlation coefficient of the antenna pairing(s) between the reference antenna and the adjacent and/or close antenna(s) satisfies a polarization MIMO threshold (e.g., that indicates a high correlation). Alternatively, or additionally, the high correlation coefficient may indicate that spatial MIMO is unsuitable (e.g., may result in data recovery errors). That is, the correlation coefficient of each antenna pairing of the first set of co-polarized antennas may fail to satisfy a spatial MIMO threshold (e.g., that indicates a low correlation). However, and as shown by the third correlation coefficient chart 416, the correlation coefficient of at least some antenna pairings may fail to satisfy the polarization MIMO threshold for one or more angular spreads. Accordingly, polarization MIMO may be unsuitable for some angular spreads at higher frequencies. That is, polarization MIMO may result in degraded signal quality for a transmission that has a particular angular spread and a higher carrier frequency (e.g., 47.7 GHZ). Alternatively, or additionally, for some angular spreads, the correlation coefficient of the antenna pairings may satisfy the spatial MIMO threshold. Thus, spatial MIMO may be suitable at higher carrier frequencies for some angular spreads.

FIG. 4C includes a first performance chart 418 and a second performance chart 420. The first performance chart 418 illustrates an example performance of polarization MIMO based at least in part on frequency and an angular spread, and the second performance chart 420 provides an example performance of spatial MIMO based at least in part on frequency and angular spread. Accordingly, a horizontal axis of each performance chart represents frequency and a vertical axis of each chart represents an angular spread (e.g., of a dominant cluster in a communication channel). Each performance chart also identifies a maximum angular spread through the use of a dashed line. In some aspects, the first performance chart 418 and/or the second performance chart 420 may be associated with a spectral efficiency performance. Alternatively, or additionally, the first performance chart 418 and/or the second performance chart 420 may be associated with a data rate performance.

The first performance chart 418 includes a first threshold 422 that delincates, distinguishes, and/or identifies when polarization MIMO satisfies a performance condition and/or when polarization MIMO fails to satisfy the performance condition, such as a particular data rate and/or a particular spectral efficiency. For example, the first threshold 422 may be based at least in part on a frequency, an angular spread, one or more correlation coefficients, and/or a performance condition (e.g., a particular data rate and/or a particular spectral efficiency). To illustrate, the first threshold 422 may be based at least in part on a set of correlation coefficients that are generated based at least in part on one or more carrier frequencies and/or one or more angular spreads as described with regard to FIG. 4B. Accordingly, the first threshold 422 may indicate that a first polarization MIMO communication that is based at least in part on a first carrier frequency and a first angular spread (e.g., characterized by a first point 424) may satisfy the performance condition. Alternatively, or additionally, the first threshold 422 may indicate that a second polarization MIMO communication that is based at least in part on a second carrier frequency and a second angular spread (e.g., characterized by a second point 426) may fail to satisfy the performance condition. As shown by FIG. 4C, the first threshold 422 indicates that polarization MIMO may fail to satisfy a performance condition as a carrier frequency increases for some antenna modules.

The second performance chart 420 includes a second threshold 428 that delineates, distinguishes, and/or identifies when spatial MIMO satisfies a performance condition and/or when spatial MIMO fails to satisfy the performance condition, such as a particular data rate and/or a particular spectral efficiency. In a similar manner as the first threshold 422, the second threshold 428 may be based at least in part on a frequency, an angular spread, one or more correlation coefficients, and/or a performance condition. Accordingly, the second threshold 428 may indicate that a first spatial MIMO communication that is based at least in part on a first carrier frequency and a first angular spread (e.g., characterized by a third point 430) may fail to satisfy the performance condition, and that a second spatial MIMO communication at a second carrier frequency and second angular spread (e.g., characterized by a fourth point 432) may satisfy the performance condition. Accordingly, and as shown by FIG. 4C, spatial MIMO may satisfy a performance condition as a carrier frequency increases for some antenna modules.

As described above, a correlation coefficient may provide an indication of performance of an antenna module (e.g., a multiband antenna module) for a polarization MIMO communication and/or a spatial MIMO communication. A MIMO configuration threshold that is based at least in part on correlation coefficients for multiple frequencies and/or angular spreads of a dominant cluster in a communication channel may enable a network node 110 configure a MIMO communication with a preferred MIMO configuration (e.g., polarization MIMO configuration or spatial MIMO configuration) that improves a performance of the MIMO communication (e.g., an increased data rate and/or an increased spectral efficiency) relative to other MIMO configurations. Selecting a MIMO configuration that improves a performance of the MIMO communication may result in an increased signal quality (e.g., decreased distortion, increased signal power, and/or decreased interference), decreased data recovery errors, and/or increased data throughput.

As indicated above, FIGS. 4A, 4B, 4C are provided as examples. Other examples may differ from what is described with regard to FIGS. 4A, 4B, and 4C.

Figure 5:
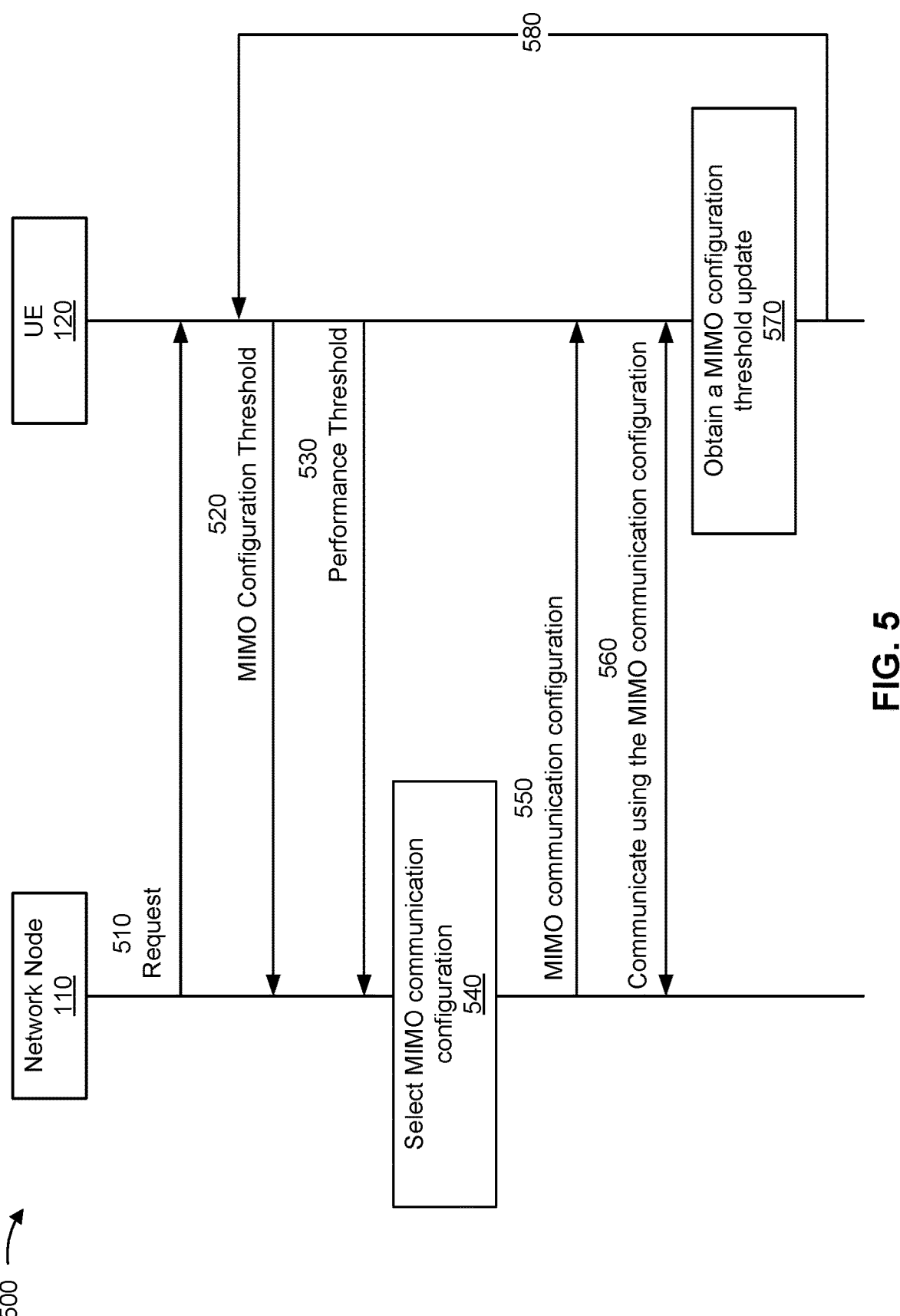
FIG. 5 is a diagram illustrating an example of a wireless communication process between a network node and a UE, in accordance with the present disclosure.

FIG. 5 is a diagram illustrating an example 500 of a wireless communication process between a network node (e.g., the network node 110) and a UE (e.g., the UE 120), in accordance with the present disclosure.

As shown by reference number 510, a network node 110 may transmit, and a UE 120 may receive, an indication of a request for a MIMO configuration threshold, such as a request for one or more frequency-dependent channel parameters such as gains over an angular spread, and/or angular spread thresholds that indicate a MIMO configuration performance based at least in part on a carrier frequency and/or an angular spread. For example, the network node 110 may indicate a request for a first frequency-dependent angular spread threshold that increases with frequency (e.g., a polarization MIMO configuration threshold) and/or a second frequency-dependent angular spread threshold that decreases with frequency (e.g., a spatial MIMO configuration threshold). A frequency-dependent angular spread threshold may indicate one or more carrier frequencies and/or angular spreads in which a polarization MIMO configuration satisfies and/or fails to satisfy a performance threshold as described with regard to FIG. 4C. Alternatively, or additionally, a frequency-dependent angular spread threshold may indicate one or more carrier frequencies and/or angle spreads in which a spatial MIMO configuration satisfies and/or fails to satisfy a performance threshold as described with regard to FIG. 4C.

The network node 110 may transmit the indication in Layer 1 signaling (e.g., downlink control information (DCI)), Layer 2 signaling (e.g., a medium access control (MAC) control element (CE)), and/or Layer 3 signaling (e.g., a radio resource control (RRC) message). In some aspects, the network node 110 may explicitly request the MIMO configuration threshold(s), such as by setting a bit field (e.g., in an RRC message, in DCI, and/or in a MAC CE) to a value (e.g., "1" or "0") that specifies the request. As one example, the network node 110 may set a bit field in a UE capability information request message to the value. In other aspects, the network node 110 may implicitly request the MIMO configuration threshold(s), such as by transmitting a request for UE capability information without including the bit field and/or without setting the bit field.

In transmitting an indication of a request for the MIMO configuration threshold, the network node 110 may alternatively or additionally indicate a request for a performance threshold that is associated with the MIMO configuration threshold. For example, the network node 110 may request a data rate performance threshold that is associated with a polarization MIMO configuration threshold and/or a spatial MIMO configuration threshold. To illustrate, and as described with regard to FIG. 4C, the first threshold 422 may be based at least in part on a data rate performance threshold such that a first polarization MIMO communication that is based at least in part on a carrier frequency and angular spread above the first threshold 422 may satisfy the data rate performance threshold, and a second polarization MIMO communication that is based at least in part on a carrier frequency and angular spread below the first threshold 422 may fail to satisfy the data rate performance threshold. Accordingly, the network node 110 may indicate a request for a performance threshold associated with the polarization MIMO configuration threshold. Alternatively, or additionally, the network node 110 may indicate a request for a performance threshold associated with a spatial MIMO configuration threshold.

As shown by reference number 520, the UE 120 may transmit, and the network node 110 may receive, an indication of one or more MIMO configuration thresholds. Alternatively, or additionally, and as shown by reference number 530, the UE 120 may transmit, and the network node 110 may receive, an indication of one or more performance thresholds that are associated with a respective MIMO configuration threshold, such as a spectral efficiency performance threshold and/or a data rate performance threshold. In some aspects, the performance threshold may be specific to a MIMO configuration, such as a polarization MIMO performance threshold for a first frequency-dependent angular spread threshold that is associated with polarized MIMO communications and/or a spatial MIMO performance threshold for a second frequency-dependent angular spread threshold that is associated with spatial MIMO communications. While the example 500 shows the indication of the MIMO configuration threshold being signaled separately from the indication of the performance threshold, other examples may include the MIMO configuration threshold and the performance threshold being signaled together in a single transmission.

The UE 120 may transmit the indication of the MIMO configuration threshold and/or the performance threshold in Layer 1 signaling (e.g., uplink control information (UCI)), Layer 2 signaling (e.g., a MAC CE), and/or Layer 3 signaling (e.g., an RRC message). As one example, the UE 120 may indicate the MIMO configuration threshold(s) and/or the performance threshold(s) in UE capability information. In some aspects, to indicate a MIMO configuration threshold, the UE 120 may indicate an angle and/or slope. To illustrate, the UE 120 may indicate the angle and/or slope of the first threshold 422 and/or the second threshold 428. The angle and/or slope may be based at least in part on a span of frequencies and/or a span of angular spreads. The UE 120 may alternatively or additionally indicate if the MIMO configuration threshold increases with frequency or decreases with frequency.

In some aspects, the UE 120 may obtain the MIMO configuration threshold information and/or performance threshold(s) from memory. As one example, a manufacturing, assembly, calibration, and/or verification process associated with the UE 120 may programmatically generate and/or store the MIMO configuration threshold information and/or performance threshold(s) in memory of the UE 120. Alternatively, or additionally, an operator may manually store and/or update the MIMO configuration threshold information in memory of the UE 120 (e.g., programmatically). In some aspects, the UE 120 may calculate and/or update the MIMO configuration information based at least in part on calculating correlation coefficients of co-polarized antenna elements and/or cross-polarized antenna elements.

In some aspects, the UE 120 may receive one or more reference signals, such as one or more channel state information reference signals (CSI-RSs), and generate one or more metrics that characterize a communication channel and/or how the UE 120 observes the communication channel. The UE 120 observations may be based at least in part on an antenna module (e.g., a multiband antenna module). The UE 120 May calculate and/or update the MIMO configuration threshold based at least in part on the one or more metrics. To illustrate, the UE 120 may calculate, as the one or more metrics, one or more correlation coefficients for antenna elements included in the UE 120 based at least in part on the reference signals, such as one or more correlation coefficients for co-polarized antenna elements and/or one or more correlation coefficients for cross-polarized antenna elements included in a multiband antenna module that includes M antenna elements. The UE 120 may update the MIMO configuration threshold based at least in part on the correlation coefficient(s) and/or a performance threshold. Alternatively, or additionally, the UE 120 may obtain the update to the MIMO configuration threshold from memory. To illustrate, the MIMO configuration threshold information stored in memory may include multiple MIMO configuration thresholds that are each associated with a respective signal metric. Based at least in part on the one or more signal metrics associated with the reference signal(s), the UE 120 may select a new MIMO configuration threshold that is associated with the generated signal metric(s). Accordingly, the UE 120 may indicate the updated MIMO configuration threshold to the network node 110.

As shown by reference number 540, the network node 110 may select a MIMO communication configuration. As one example, the network node 110 may assign an air interface resource to MIMO communications with the UE 120 based at least in part on a carrier frequency. In some aspects, the network node 110 may select between a polarized MIMO configuration and a spatial MIMO configuration for the MIMO communication based at least in part on the MIMO configuration threshold and/or the performance threshold received from the UE 120. For example, a quality-of-service (QOS) flow may have a data rate condition and/or data throughput condition, and the network node 110 may select the MIMO communication configuration based at least in part on a MIMO configuration threshold that is associated with a data rate performance threshold and/or a spectral efficiency performance threshold that satisfies the data rate condition and/or the data throughput condition. Alternatively, or additionally, the network node 110 may select between polarized MIMO configuration and spatial MIMO configuration for the MIMO communication based at least in part on an angular spread. To illustrate, the network node 110 may measure an angular spread of a dominant cluster in the communication channel based at least in part on an uplink communication and/or may receive an indication of the angular spread from the UE 120 and based at least in part on a downlink communication. In some aspects, the network node 110 may estimate the angular spread based at least in part on a spatial width of a downlink beam and/or an uplink beam.

As shown by reference number 550, the network node 110 may transmit, and a UE 120 may receive, an indication of the MIMO communication configuration. The network node 110 may transmit the indication of the MIMO communication configuration in Layer 1 signaling. Layer 2 signaling, and/or Layer 3 signaling.

As shown by reference number 560, the network node 110 and the UE 120 may communicate with one another based at least in part on using the MIMO communication configuration. For example, the network node 110 may transmit a downlink MIMO communication based at least in part on the MIMO communication configuration and/or the UE 120 may recover information from the downlink MIMO communication based at least in part on the MIMO communication configuration. Alternatively, or additionally, the UE 120 may transmit an uplink MIMO communication based at least in part on the MIMO communication configuration and/or the network node 110 may recover information from the uplink MIMO communication based at least in part on the MIMO communication configuration.

As shown by reference number 570, the UE 120 may obtain an update to the MIMO configuration threshold. As one example, the UE 120 may generate a signal metric (e.g., RSSI, RSRP, and/or CQI) that indicates a communication channel has changed by at least a threshold. Based at least in part on the signal metric changing by at least a threshold, the UE 120 may calculate one or more updates to the MIMO configuration threshold. Alternatively, or additionally, the UE 120 may obtain the update to the MIMO configuration threshold from memory. To illustrate, and as described above, the MIMO configuration threshold information stored in memory may include multiple MIMO configuration thresholds that are each associated with a respective signal metric. Based at least in part on the signal metric changing by at least a threshold, the UE 120 may select a new MIMO configuration threshold that is associated with the generated signal metric.

As shown by reference number 580, the UE 120 may transmit, and the network node 110 may receive, an indication of the update to the MIMO configuration threshold. The UE 120 may iteratively obtain updates to the MIMO configuration and indicate the update to the MIMO configuration to the network node 110.

A UE indicating a MIMO configuration threshold to a network node, such as a MIMO configuration threshold that is based at least in part on a frequency-dependent angular spread of a dominant cluster, may enable the network node to configure a MIMO communication with a preferred MIMO configuration (e.g., polarization MIMO configuration or spatial MIMO configuration) that improves a performance of the MIMO communication (e.g., an increases data rate and/or an increased spectral efficiency) relative to other MIMO configurations. Alternatively, or additionally, the UE indicating the MIMO configuration threshold to the network node may enable the network node to configure the MIMO communication using less signaling overhead (e.g., by reducing an amount of signaling overhead that is associated with communicating TCI state information). Selecting a MIMO configuration that improves a performance of the MIMO communication may result in an increased signal quality (e.g., decreased distortion, increased signal power, and/or decreased interference) that reduces data recovery errors and/or increases data throughput. Reducing signaling overhead may also increase an amount of air interface resources available for communicating user data, thus increasing data throughput and/or reducing data-transfer latencies in a wireless network.

As indicated above, FIG. 5 is provided as an example. Other examples may differ from what is described with regard to FIG. 5.

FIG. 6 is a diagram illustrating an example process 600 performed, for example, by a UE, in accordance with the present disclosure. Example process 600 is an example where the UE (e.g., UE 120) performs operations associated with switching between polarization and spatial multiple-input-multiple-output based on an antenna module.

As shown in FIG. 6, in some aspects, process 600 may include transmitting a first indication of a MIMO configuration threshold that is associated with a selection between a polarization MIMO configuration and a spatial MIMO configuration, the MIMO configuration threshold being based at least in part on a performance threshold (block 610). For example, the UE (e.g., using transmission component 804 and/or communication manager 806, depicted in FIG. 8) may transmit a first indication of a MIMO configuration threshold that is associated with a selection between a polarization MIMO configuration and a spatial MIMO configuration, the MIMO configuration threshold being based at least in part on a performance threshold, as described above.

As further shown in FIG. 6, in some aspects, process 600 may include receiving a second indication of a MIMO communication configuration that specifies the selection (block 620). For example, the UE (e.g., using reception component 802 and/or communication manager 806, depicted in FIG. 8) may receive a second indication of a MIMO communication configuration that specifies the selection, as described above.

Process 600 may include additional aspects, such as any single aspect or any combination of aspects described below and/or in connection with one or more other processes described elsewhere herein.

In a first aspect, process 600 includes transmitting a third indication of the performance threshold.

In a second aspect, the performance threshold includes at least one of a spectral efficiency performance threshold, or a data rate performance threshold.

In a third aspect, the performance threshold includes at least one of a polarization MIMO performance threshold, or a spatial MIMO performance threshold.

In a fourth aspect, the MIMO configuration threshold includes a frequency-dependent angular spread threshold that indicates a polarization MIMO performance based at least in part on a carrier frequency and an angular spread of the dominant clusters in the channel between the UE and a network node.

In a fifth aspect, the MIMO configuration threshold includes a frequency-dependent angular spread threshold that indicates a spatial MIMO performance based at least in part on a carrier frequency and an angular spread of the dominant clusters in the channel between the UE and the network node.

In a sixth aspect, transmitting the first indication of the MIMO configuration threshold includes transmitting the first indication of the MIMO configuration threshold in UE capability information.

In a seventh aspect, process 600 includes obtaining an updated MIMO configuration threshold based at least in part on a set of reference signals, and transmitting a third indication of the updated MIMO configuration threshold.

In an eighth aspect, process 600 includes calculating one or more correlation coefficients associated with M antenna elements based at least in part on one or more frequencies and one or more angular spreads, where M is an integer, and the MIMO configuration threshold is based at least in part on the one or more correlation coefficients.

In a ninth aspect, calculating the one or more correlation coefficients includes at least one of calculating a first correlation coefficient for two co-polarized antenna elements of the M antenna elements, or calculating a second correlation coefficient for two cross-polarized antenna elements of the M antenna elements.

In a tenth aspect, process 600 includes selecting a reference antenna element from the M antenna elements, calculating, as a first subset of the one or more correlation coefficients, a respective co-polarized correlation coefficient between the reference antenna element and each co-polarized antenna element within the M antenna elements, and calculating, as a second subset of the one or more correlation coefficients, a respective cross-polarized correlation coefficient between the reference antenna element and each cross-polarized antenna element within the M antenna elements.

In an eleventh aspect, the M antenna elements are included in a multiband antenna component.

In a twelfth aspect, process 600 includes communicating with another device based at least in part on the MIMO communication configuration.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a network node, in accordance with the present disclosure. Example process 700 is an example where the network node (e.g., network node 110) performs operations associated with switching between polarization and spatial multiple-input-multiple-output based on an antenna module.

As shown in FIG. 7, in some aspects, process 700 may include receiving a first indication of a MIMO configuration threshold that is associated with a selection between a polarized MIMO configuration and a spatial MIMO configuration, the MIMO configuration threshold being based at least in part on a performance threshold (block 710). For example, the network node (e.g., using reception component 902 and/or communication manager 906, depicted in FIG. 9) may receive a first indication of a MIMO configuration threshold that is associated with a selection between a polarized MIMO configuration and a spatial MIMO configuration, the MIMO configuration threshold being based at least in part on a performance threshold, as described above.

As further shown in FIG. 7, in some aspects, process 700 may include transmitting a second indication of a MIMO communication configuration that specifies the selection (block 720). For example, the network node (e.g., using transmission component 904 and/or communication manager 906, depicted in FIG. 9) may transmit a second indication of a MIMO communication configuration that specifies the selection, as described above.

Process 700 may include additional aspects, such as any single aspect or any combination of aspects described below and/or in connection with one or more other processes described elsewhere herein.

In a first aspect, process 700 includes performing the selection between the polarized MIMO configuration and the spatial MIMO configuration based at least in part on the MIMO configuration threshold.

In a second aspect, performing the selection includes performing the selection based at least in part on at least one of a carrier frequency, or an angular spread.

In a third aspect, process 700 includes receiving a third indication of the performance threshold.

In a fourth aspect, the performance threshold includes at least one of a spectral efficiency performance threshold, or a data rate performance threshold.

In a fifth aspect, the performance threshold includes at least one of a polarized MIMO performance threshold, or a spatial MIMO performance threshold.

In a sixth aspect, the MIMO configuration threshold includes a frequency-dependent angular spread threshold that indicates a polarized MIMO performance based at least in part on a carrier frequency and an angular spread.

In a seventh aspect, the MIMO configuration threshold includes a frequency-dependent angular spread threshold that indicates a spatial MIMO performance based at least in part on a carrier frequency and an angular spread.

In an eighth aspect, receiving the first indication of the MIMO configuration threshold includes receiving the first indication of the MIMO configuration threshold in UE capability information.

In a ninth aspect, process 700 includes receiving a third indication of an updated MIMO configuration threshold, and selecting an updated MIMO communication configuration based at least in part on the updated MIMO configuration threshold.

In a tenth aspect, the MIMO configuration threshold is associated with a UE, and process 600 includes communicating with the UE based at least in part on the MIMO communication configuration.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
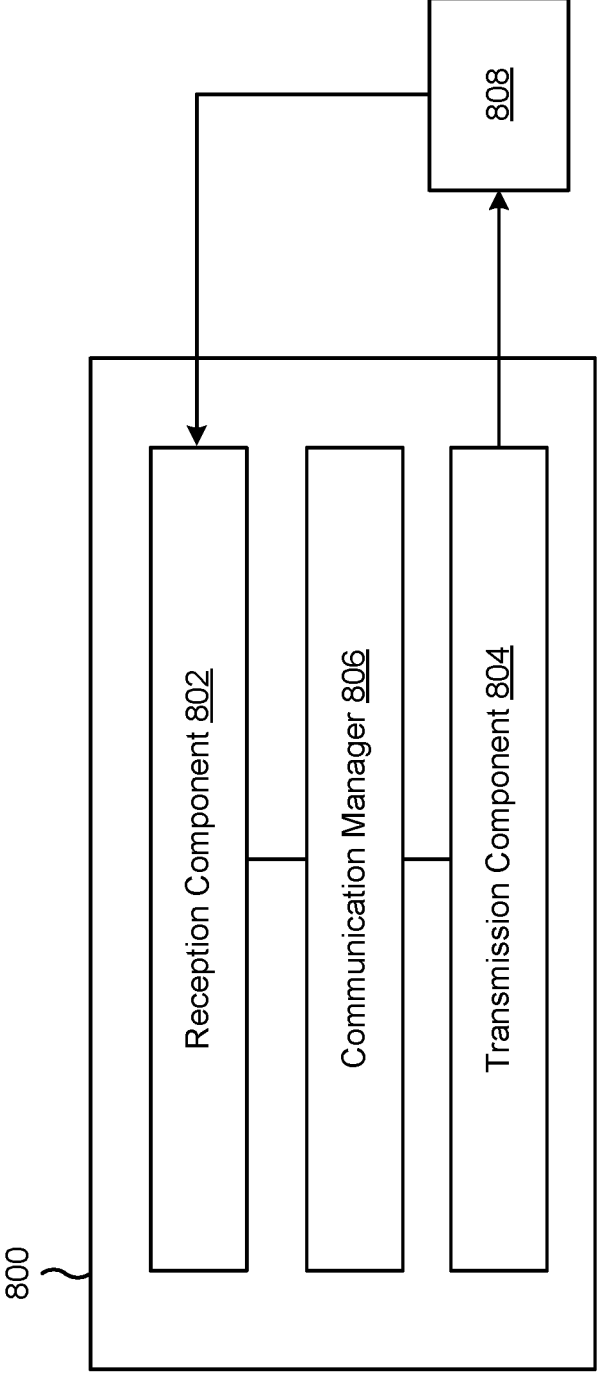
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 140 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIGS. 3A-7. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digitalto-analog conversion, multiplexing, interleaving, mapping, or encoding, among other examples), and may transmit the processed signals to the apparatus 808. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The transmission component 804 may transmit a first indication of a MIMO configuration threshold that is associated with a selection between a polarization MIMO configuration and a spatial MIMO configuration, the MIMO configuration threshold being based at least in part on a performance threshold. The reception component 802 may receive a second indication of a MIMO communication configuration that specifies the selection.

The transmission component 804 may transmit a third indication of the performance threshold.

The communication manager 806 may obtain an updated MIMO configuration threshold based at least in part on a set of reference signals.

The transmission component 804 may transmit a third indication of the updated MIMO configuration threshold.

The communication manager 806 may calculate one or more correlation coefficients associated with M antenna elements based at least in part on one or more frequencies and one or more angular spreads, where M is an integer.

The communication manager 806 may select a reference antenna element from the M antenna elements.

The communication manager 806 may calculate, as a first subset of the one or more correlation coefficients, a respective co-polarized correlation coefficient between the reference antenna element and each co-polarized antenna element within the M antenna elements.

The communication manager 806 may calculate, as a second subset of the one or more correlation coefficients, a respective cross-polarized correlation coefficient between the reference antenna element and each cross-polarized antenna element within the M antenna elements.

The communication manager 806 may communicate with another device based at least in part on the MIMO communication configuration.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
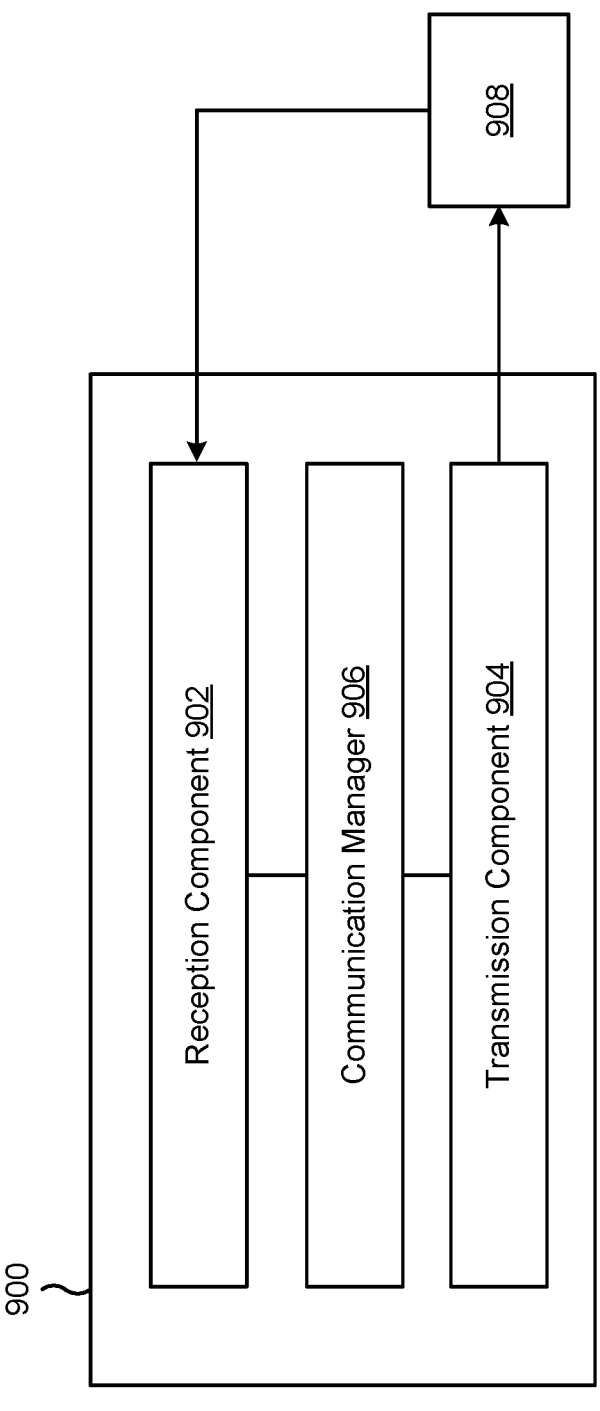
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 150 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 3A-7. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2. In some aspects, the reception component 902 and/or the transmission component 904 may include or may be included in a network interface. The network interface may be configured to obtain and/or output signals for the apparatus 900 via one or more communications links, such as a backhaul link, a midhaul link, and/or a fronthaul link.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digitalto-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive a first indication of a MIMO configuration threshold that is associated with a selection between a polarized MIMO configuration and a spatial MIMO configuration, the MIMO configuration threshold being based at least in part on a performance threshold. The transmission component 904 may transmit a second indication of a MIMO communication configuration that specifies the selection.

The communication manager 906 may perform the selection between the polarized MIMO configuration and the spatial MIMO configuration based at least in part on the MIMO configuration threshold.

The reception component 902 may receive a third indication of the performance threshold.

The reception component 902 may receive a third indication of an updated MIMO configuration threshold.

The communication manager 906 may select an updated MIMO communication configuration based at least in part on the updated MIMO configuration threshold.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: transmitting a first indication of a multiple-input-multiple-output (MIMO) configuration threshold that is associated with a selection between a polarization MIMO configuration and a spatial MIMO configuration, the MIMO configuration threshold being based at least in part on a performance threshold; and receiving a second indication of a MIMO communication configuration that specifies the selection.

Aspect 2: The method of Aspect 1, further comprising: transmitting a third indication of the performance threshold.

Aspect 3: The method of Aspect 2, wherein the performance threshold includes at least one of: a spectral efficiency performance threshold, or a data rate performance threshold.

Aspect 4: The method of Aspect 2, wherein the performance threshold includes at least one of: a polarization MIMO performance threshold, or a spatial MIMO performance threshold.

Aspect 5: The method of any of Aspects 1-4, wherein the MIMO configuration threshold includes a frequency-dependent angular spread threshold that indicates a polarization MIMO performance based at least in part on a carrier frequency and an angular spread of the dominant clusters in the channel between the UE and a network node.

Aspect 6: The method of any of Aspects 1-5, wherein the MIMO configuration threshold includes a frequency-dependent angular spread threshold that indicates a spatial MIMO performance based at least in part on a carrier frequency and an angular spread of the dominant clusters in the channel between the UE and the network node.

Aspect 7: The method of any of Aspects 1-6, wherein transmitting the first indication of the MIMO configuration threshold comprises: transmitting the first indication of the MIMO configuration threshold in UE capability information.

Aspect 8: The method of any of Aspects 1-7, further comprising: obtaining an updated MIMO configuration threshold based at least in part on a set of reference signals; and transmitting a third indication of the updated MIMO configuration threshold.

Aspect 9: The method of any of Aspects 1-8, further comprising: calculating one or more correlation coefficients associated with M antenna elements based at least in part on one or more frequencies and one or more angular spreads, wherein M is an integer, and wherein the MIMO configuration threshold is based at least in part on the one or more correlation coefficients, wherein the MIMO configuration threshold is based at least in part on the one or more correlation coefficients.

Aspect 10: The method of Aspect 9, wherein calculating the one or more correlation coefficients comprises at least one of: calculating a first correlation coefficient for two co-polarized antenna elements of the M antenna elements; or calculating a second correlation coefficient for two cross-polarized antenna elements of the M antenna elements.

Aspect 11: The method of Aspect 9, further comprising: selecting a reference antenna element from the M antenna elements; calculating, as a first subset of the one or more correlation coefficients, a respective co-polarized correlation coefficient between the reference antenna element and each co-polarized antenna element within the M antenna elements; and calculating, as a second subset of the one or more correlation coefficients, a respective cross-polarized correlation coefficient between the reference antenna element and each cross-polarized antenna element within the M antenna elements.

Aspect 12: The method of Aspect 9, wherein the M antenna elements are included in a multiband antenna component.

Aspect 13: The method of any of Aspects 1-12, further comprising: communicating with another device based at least in part on the MIMO communication configuration.

Aspect 14: A method of wireless communication performed by a network node, comprising: receiving a first indication of a multiple-input-multiple-output (MIMO) configuration threshold that is associated with a selection between a polarized MIMO configuration and a spatial MIMO configuration, the MIMO configuration threshold being based at least in part on a performance threshold; and transmitting a second indication of a MIMO communication configuration that specifies the selection.

Aspect 15: The method of Aspect 14, further comprising: performing the selection between the polarized MIMO configuration and the spatial MIMO configuration based at least in part on the MIMO configuration threshold.

Aspect 16: The method of Aspect 15, wherein performing the selection comprises: performing the selection based at least in part on at least one of: a carrier frequency, or an angular spread.

Aspect 17: The method of any of Aspects 14-16, further comprising: receiving a third indication of the performance threshold.

Aspect 18: The method of Aspect 17, wherein the performance threshold includes at least one of: a spectral efficiency performance threshold, or a data rate performance threshold.

Aspect 19: The method of Aspect 17, wherein the performance threshold includes at least one of: a polarized MIMO performance threshold, or a spatial MIMO performance threshold.

Aspect 20: The method of any of Aspects 14-19, wherein the MIMO configuration threshold includes a frequency-dependent angular spread threshold that indicates a polarized MIMO performance based at least in part on a carrier frequency and an angular spread.

Aspect 21: The method of any of Aspects 14-20, wherein the MIMO configuration threshold includes a frequency-dependent angular spread threshold that indicates a spatial MIMO performance based at least in part on a carrier frequency and an angular spread.

Aspect 22: The method of any of Aspects 14-21, wherein receiving the first indication of the MIMO configuration threshold comprises: receiving the first indication of the MIMO configuration threshold in UE capability information.

Aspect 23: The method of Aspect 22, further comprising: receiving a third indication of an updated MIMO configuration threshold; and selecting an updated MIMO communication configuration based at least in part on the updated MIMO configuration threshold.

Aspect 24: The method of any of Aspects 14-23, wherein the MIMO configuration threshold is associated with a user equipment (UE), and the method further comprises: communicating with the UE based at least in part on the MIMO communication configuration.

Aspect 25: An apparatus for wireless communication at a device, comprising a processor; memory coupled with the processor; and instructions stored in the memory and executable by the processor to cause the apparatus to perform the method of one or more of Aspects 1-24.

Aspect 26: A device for wireless communication, comprising a memory and one or more processors coupled to the memory, the one or more processors individually or collectively configured to perform the method of one or more of Aspects 1-24.

Aspect 27: An apparatus for wireless communication, comprising at least one means for performing the method of one or more of Aspects 1-24.

Aspect 28: A non-transitory computer-readable medium storing code for wireless communication, the code comprising instructions executable by a processor to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, the one or more processors individually or collectively configured to:
      transmit a first indication of a multiple-input-multiple-output (MIMO) configuration threshold that is associated with a selection between a polarization MIMO configuration and a spatial MIMO configuration, the MIMO configuration threshold being based at least in part on a performance threshold;
      receive a second indication of a MIMO communication configuration that specifies the selection;
      obtain an updated MIMO configuration threshold based at least in part on a set of reference signals; and
      transmit a third indication of the updated MIMO configuration threshold.

2. The apparatus of claim 1,
   wherein the one or more processors are further configured, individually or collectively, to:
      transmit a third indication of the performance threshold.

3. The apparatus of claim 2, wherein the performance threshold includes at least one of:
   a spectral efficiency performance threshold, or
   a data rate performance threshold.

4. The apparatus of claim 2, wherein the performance threshold includes at least one of:
   a polarization MIMO performance threshold, or
   a spatial MIMO performance threshold.

5. The apparatus of claim 1,
   wherein the MIMO configuration threshold includes a frequency-dependent angular spread threshold that indicates a polarization MIMO performance based at least in part on a carrier frequency and an angular spread of a dominant cluster in a communication channel.

6. The apparatus of claim 1,
   wherein the MIMO configuration threshold includes a frequency-dependent angular spread threshold that indicates a spatial MIMO performance based at least in part on a carrier frequency and an angular spread of a dominant cluster in a communication channel.

7. The apparatus of claim 1,
   wherein the one or more processors, to transmit the first indication of the MIMO configuration threshold, are configured, individually or collectively, to:
      transmit the first indication of the MIMO configuration threshold in UE capability information.

8. The apparatus of claim 1,
   wherein the apparatus is a first apparatus, and the one or more processors are further configured, individually or collectively, to:
      communicate with a second apparatus based at least in part on the MIMO communication configuration.

9. An apparatus for wireless communication at a network node, comprising:
a memory; and
one or more processors, coupled to the memory, the one or more processors individually or collectively configured to:
receive a first indication of a multiple-input-multiple-output (MIMO) configuration threshold that is associated with a selection between a polarized MIMO configuration and a spatial MIMO configuration, the MIMO configuration threshold being based at least in part on a performance threshold;
transmit a second indication of a MIMO communication configuration that specifies the selection;
receive a third indication of an updated MIMO configuration threshold; and
select an updated MIMO communication configuration based at least in part on the updated MIMO configuration threshold.

10. The apparatus of claim 9,
wherein the one or more processors are further configured, individually or collectively, to:
perform the selection between the polarized MIMO configuration and the spatial MIMO configuration based at least in part on the MIMO configuration threshold.

11. The apparatus of claim 10,
wherein the one or more processors, to perform the selection, are configured, individually or collectively, to:
perform the selection based at least in part on at least one of:
a carrier frequency, or
an angular spread.

12. The apparatus of claim 9,
wherein the one or more processors are further configured, individually or collectively, to:
receive a third indication of the performance threshold.

13. The apparatus of claim 12, wherein the performance threshold includes at least one of:
a spectral efficiency performance threshold, or
a data rate performance threshold.

14. The apparatus of claim 12, wherein the performance threshold includes at least one of:
a polarized MIMO performance threshold, or
a spatial MIMO performance threshold.

15. The apparatus of claim 9,
wherein the MIMO configuration threshold includes a frequency-dependent angular spread threshold that indicates a polarized MIMO performance based at least in part on a carrier frequency and an angular spread.

16. The apparatus of claim 9,
wherein the MIMO configuration threshold includes a frequency-dependent angular spread threshold that indicates a spatial MIMO performance based at least in part on a carrier frequency and an angular spread.

17. The apparatus of claim 9,
wherein the one or more processors, to receive the first indication of the MIMO configuration threshold, are configured, individually or collectively, to:
receive the first indication of the MIMO configuration threshold in user equipment (UE) capability information.

18. The apparatus of claim 9,
wherein the one or more processors are further configured, individually or collectively, to:

communicate with a user equipment (UE) based at least in part on the MIMO communication configuration.

19. A method of wireless communication performed by a user equipment (UE), comprising:
transmitting a first indication of a multiple-input-multiple-output (MIMO) configuration threshold that is associated with a selection between a polarization MIMO configuration and a spatial MIMO configuration, the MIMO configuration threshold being based at least in part on a performance threshold;
receiving a second indication of a MIMO communication configuration that specifies the selection;
obtaining an updated MIMO configuration threshold based at least in part on a set of reference signals; and
transmitting a third indication of the updated MIMO configuration threshold.

20. The method of claim 19, further comprising:
transmitting a third indication of the performance threshold.

21. The method of claim 19,
wherein the MIMO configuration threshold includes a frequency-dependent angular spread threshold that indicates a polarization MIMO performance based at least in part on a carrier frequency and an angular spread of a dominant cluster in a communication channel.

22. The method of claim 19,
wherein the MIMO configuration threshold includes a frequency-dependent angular spread threshold that indicates a spatial MIMO performance based at least in part on a carrier frequency and an angular spread of a dominant cluster a communication channel.

23. A method of wireless communication performed by a network node, comprising:
receiving a first indication of a multiple-input-multiple-output (MIMO) configuration threshold that is associated with a selection between a polarized MIMO configuration and a spatial MIMO configuration, the MIMO configuration threshold being based at least in part on a performance threshold;
transmitting a second indication of a MIMO communication configuration that specifies the selection;
receiving a third indication of an updated MIMO configuration threshold; and
selecting an updated MIMO communication configuration based at least in part on the updated MIMO configuration threshold.

24. The method of claim 23, further comprising:
performing the selection between the polarized MIMO configuration and the spatial MIMO configuration based at least in part on the MIMO configuration threshold.

25. The method of claim 24, wherein performing the selection comprises:
performing the selection based at least in part on at least one of:
a carrier frequency, or
an angular spread.

26. The method of claim 23, further comprising:
receiving a third indication of the performance threshold.

27. The method of claim 23, wherein the MIMO configuration threshold includes at least one of:
a first frequency-dependent angular spread threshold that indicates a polarized MIMO performance based at least in part on a carrier frequency and an angular spread, or a second frequency-dependent angular spread threshold that indicates a spatial MIMO performance based at least in part on the carrier frequency and the angular spread.

28. The method of claim 23, wherein the MIMO configuration threshold includes a frequency-dependent angular spread threshold that indicates a polarized MIMO performance based at least in part on a carrier frequency and an angular spread.

29. The method of claim 23, wherein the MIMO configuration threshold includes a frequency-dependent angular spread threshold that indicates a spatial MIMO performance based at least in part on a carrier frequency and an angular spread.

30. The method of claim 23, further comprising: receiving the first indication of the MIMO configuration threshold in user equipment (UE) capability information.

* * * * *